(12) United States Patent
Yamauchi et al.

(10) Patent No.: US 9,092,255 B2
(45) Date of Patent: Jul. 28, 2015

(54) MULTI-CORE PROCESSOR SYSTEM, COMPUTER PRODUCT, AND CONTROL METHOD FOR INTERRUPT EXECUTION

(71) Applicant: FUJITSU LIMITED, Kawasaki-shi, Kanagawa (JP)

(72) Inventors: Hiromasa Yamauchi, Kawasaki (JP); Koichiro Yamashita, Hachioji (JP); Takahisa Suzuki, Kawasaki (JP); Koji Kurihara, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 407 days.

(21) Appl. No.: 13/628,709

(22) Filed: Sep. 27, 2012

(65) Prior Publication Data

US 2013/0024589 A1  Jan. 24, 2013
US 2015/0081942 A9  Mar. 19, 2015

Related U.S. Application Data

(63) Continuation of application No. PCT/JP2010/055711, filed on Mar. 30, 2010.

(51) Int. Cl.
G06F 13/24 (2006.01)
G06F 9/48 (2006.01)

(52) U.S. Cl.
CPC .............. *G06F 9/4812* (2013.01); *G06F 13/24* (2013.01)

(58) Field of Classification Search
CPC ................................ G06F 13/24; G06F 9/4812
USPC ......................................... 710/260, 264–266
See application file for complete search history.

(56) References Cited

U.S. PATENT DOCUMENTS

| 6,108,744 | A | 8/2000 | Lebee | |
|---|---|---|---|---|
| 6,845,419 | B1 | 1/2005 | Moyer | |
| 7,206,884 | B2 * | 4/2007 | Kimelman et al. | 710/265 |
| 2005/0177668 | A1 * | 8/2005 | Kimelman et al. | 710/264 |
| 2006/0174246 | A1 | 8/2006 | Tamura et al. | |

(Continued)

FOREIGN PATENT DOCUMENTS

| CN | 1811718 A | 8/2006 |
|---|---|---|
| JP | 11-272632 | 10/1999 |
| JP | 2000-56986 | 2/2000 |

(Continued)

OTHER PUBLICATIONS

International Preliminary Report on Patentability issued Oct. 11, 2012 (English Translation mailed Nov. 1, 2012) in corresponding International Patent Application No. PCT/JP2010/055711.

(Continued)

*Primary Examiner* — Glenn A Auve
(74) *Attorney, Agent, or Firm* — Staas & Halsey LLP

(57) ABSTRACT

A multi-core processor system includes a given configured to queue an interrupt process of a software interrupt request to the given core, and execute queued processes in the order of queuing at the given core; execute preferentially an interrupt process of a hardware interrupt request to the given core over a process under execution at the given core; determine whether the software interrupt request is a specific software interrupt request; and perform control to preferentially execute the interrupt process without queuing, upon determining that the software interrupt request is the specific software interrupt request.

6 Claims, 14 Drawing Sheets

(56) References Cited

U.S. PATENT DOCUMENTS

2007/0124523 A1    5/2007    Shimizu et al.
2009/0132744 A1*    5/2009    Craske .......................... 710/265

FOREIGN PATENT DOCUMENTS

| JP | 2001-229031 | 8/2001 |
|----|-------------|--------|
| JP | 2003-44291 | 2/2003 |
| JP | 2007-141155 | 6/2007 |
| JP | 2007-148746 | 6/2007 |
| JP | 2009-301116 | 12/2009 |
| JP | 2010-152458 | 7/2010 |

OTHER PUBLICATIONS

Japanese Office Action mailed Mar. 11, 2014 in corresponding Japanese Application No. 2012-507955.
International Search Report of PCT/JP2010/055711 mailed May 11, 2010.
Takashi Hirokazu et al., "Linux kernel 2.6 analysis", Soft Bank Creative Corp., Nov. 30, 2006, pp. 62-63.
Chinese Office Action issued on Oct. 8, 2014 in corresponding Chinese Patent Application No. 201080065900.4.

* cited by examiner

FIG.10

FuncA: FORCED JUMP, INTERRUPTION NOT ALLOWED

FuncB: HANDLER PROCESS, INTERRUPTION ALLOWED

FuncC: FORCED JUMP, INTERRUPTION NOT ALLOWED

. . . .

TASK A : -, INTERRUPTION ALLOWED

TASK B : -, INTERRUPTION ALLOWED

TASK C: -, INTERRUPTION NOT ALLOWED

. . . .

1000

MULTI-CORE PROCESSOR SYSTEM, COMPUTER PRODUCT, AND CONTROL METHOD FOR INTERRUPT EXECUTION

CROSS REFERENCE TO RELATED APPLICATIONS

This application is a continuation application of International Application PCT/JP2010/055711, filed on Mar. 30, 2010 and designating the U.S., the entire contents of which are incorporated herein by reference.

FIELD

The embodiment discussed herein is related to a multicore processor system and a control method that control execution of an interrupt process.

BACKGROUND

Interrupt requests at a central processing unit (CPU) are roughly classified into hardware interrupt requests and software interrupt requests. A hardware interrupt request is an interrupt request that peripheral equipment of a CPU makes to the CPU. For example, when a user touches the touch screen of a cellular phone to carry out a fast forward operation during reproduction of a moving picture on the cellular phone, the touch screen makes a hardware interrupt request to the CPU. A software interrupt request is an interrupt request caused by a program under execution.

When a hardware interrupt request is made, the operating system (OS) running on the CPU saves a task under execution and immediately executes a hardware interrupt handler (interrupt process) for the hardware interrupt request. The hardware interrupt handler may call a software interrupt.

In a multi-core processor system, when a hardware interrupt request is made to a master CPU, the master CPU generates a software interrupt request, in which case a task that is interrupted by the software interrupt request may be assigned to a slave CPU. When such a task is assigned to the slave CPU, the slave CPU executes a software interrupt handler (interrupt process) for the software interrupt request through inter-processor interrupt communication.

For an example of such technology, refer to Takahashi, Hirokazu, et al, "Linux Kernel Kaidokushitsu 2.6", Softbank Creative Corp., Nov. 30, 2006, pp. 62-63.

Nonetheless, when a software interrupt request is generated through inter-processor interrupt communication, a software interrupt handler of the software interrupt request is placed in a ready-queue and awaits execution. In the ready-queue, processes are executed in their order of queuing. Consequently, a problem arises in that when numerous tasks are in the ready-queue, the start of execution of the software interrupt handler is delayed.

In other words, the time between the calling of the software interrupt handler and the start of execution of the software interrupt handler is longer than the time between the calling of the hardware interrupt handler and the start of execution of the hardware interrupt handler, resulting in a problem that the response of the software interrupt is slow.

SUMMARY

According to an aspect of an embodiment, a multi-core processor system includes a given configured to queue an interrupt process of a software interrupt request to the given core, and execute queued processes in the order of queuing at the given core; execute preferentially an interrupt process of a hardware interrupt request to the given core over a process under execution at the given core; determine whether the software interrupt request is a specific software interrupt request; and perform control to preferentially execute the interrupt process without queuing, upon determining that the software interrupt request is the specific software interrupt request.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 10 is an explanatory diagram of one example of the use-case table of a second example;

DESCRIPTION OF EMBODIMENTS

A preferred embodiment of a multicore processor system, a control program, and a control method according to the present invention is described in detail below with reference to the accompanying drawings. The multicore processor of the multicore processor system according to the present embodiment is a processor that includes multiple cores. Provided the multicore processor includes multiple cores, the multicore processor may be a single processor with multiple cores or single-core processors connected in parallel. For simplicity, single-core processors connected in parallel are taken as an example in the present embodiment.

Figure 1:
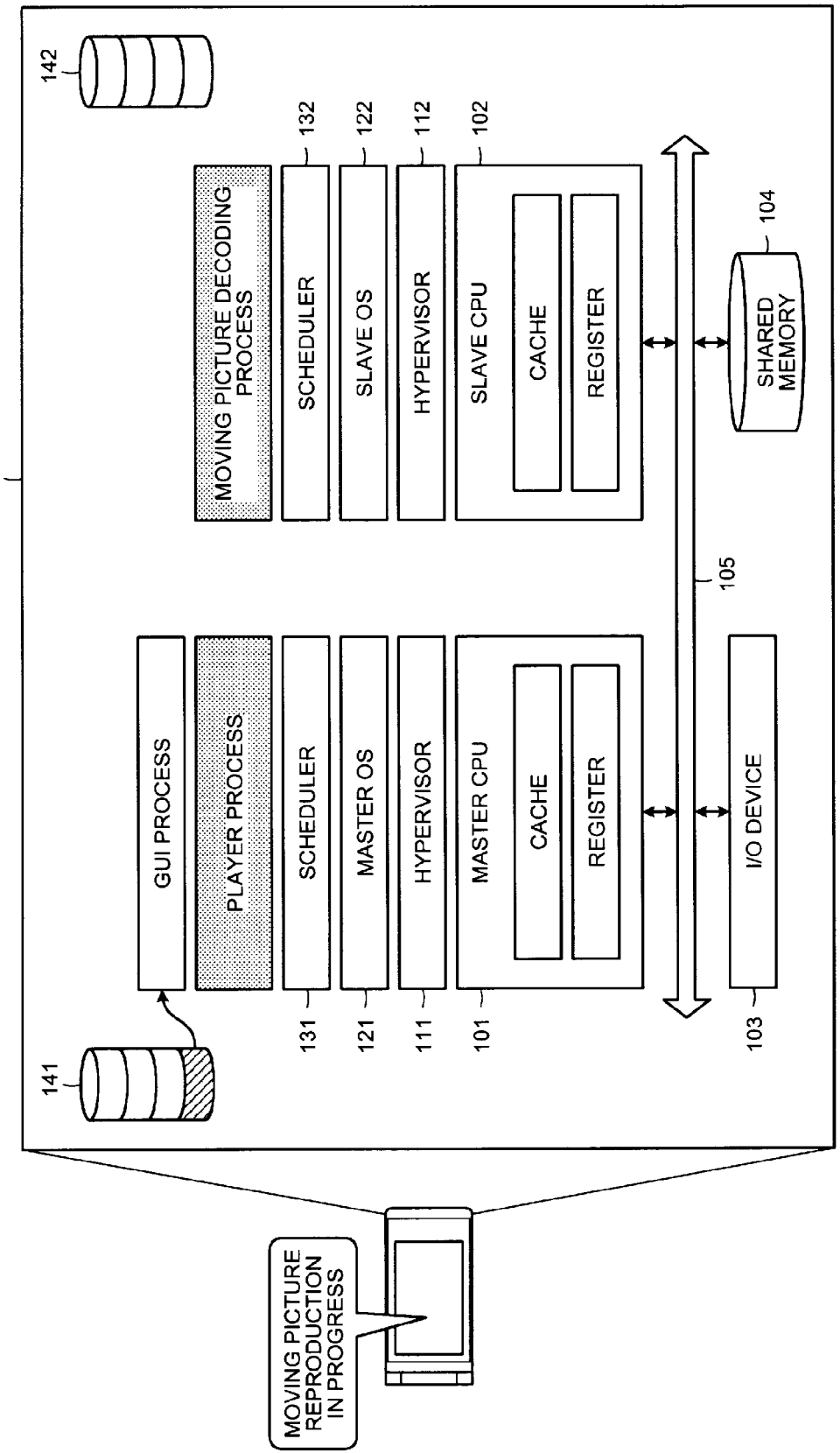
FIG. 1 is an explanatory diagram of one example of moving picture reproduction in progress.

FIG. 1 is an explanatory diagram of one example of moving picture reproduction in progress. In FIG. 1, an example in which a multi-core processor system 100 is a cellular phone is described. A master CPU 101 is executing a player process as a graphic user interface (GUI) process that is registered in a ready-queue 141. Meanwhile, a slave CPU 102 is executing a moving picture decoding process.

As is commonly known, the ready-queue 141 (or ready-queue 142) is a data structure for managing tasks that are in an executable state. Context information of a task registered in the ready-queue 141 (or ready-queue 142) is extracted to execute the task. The context information is the information indicative of the internal state of a program and the location of a program in a memory.

Figure 2:
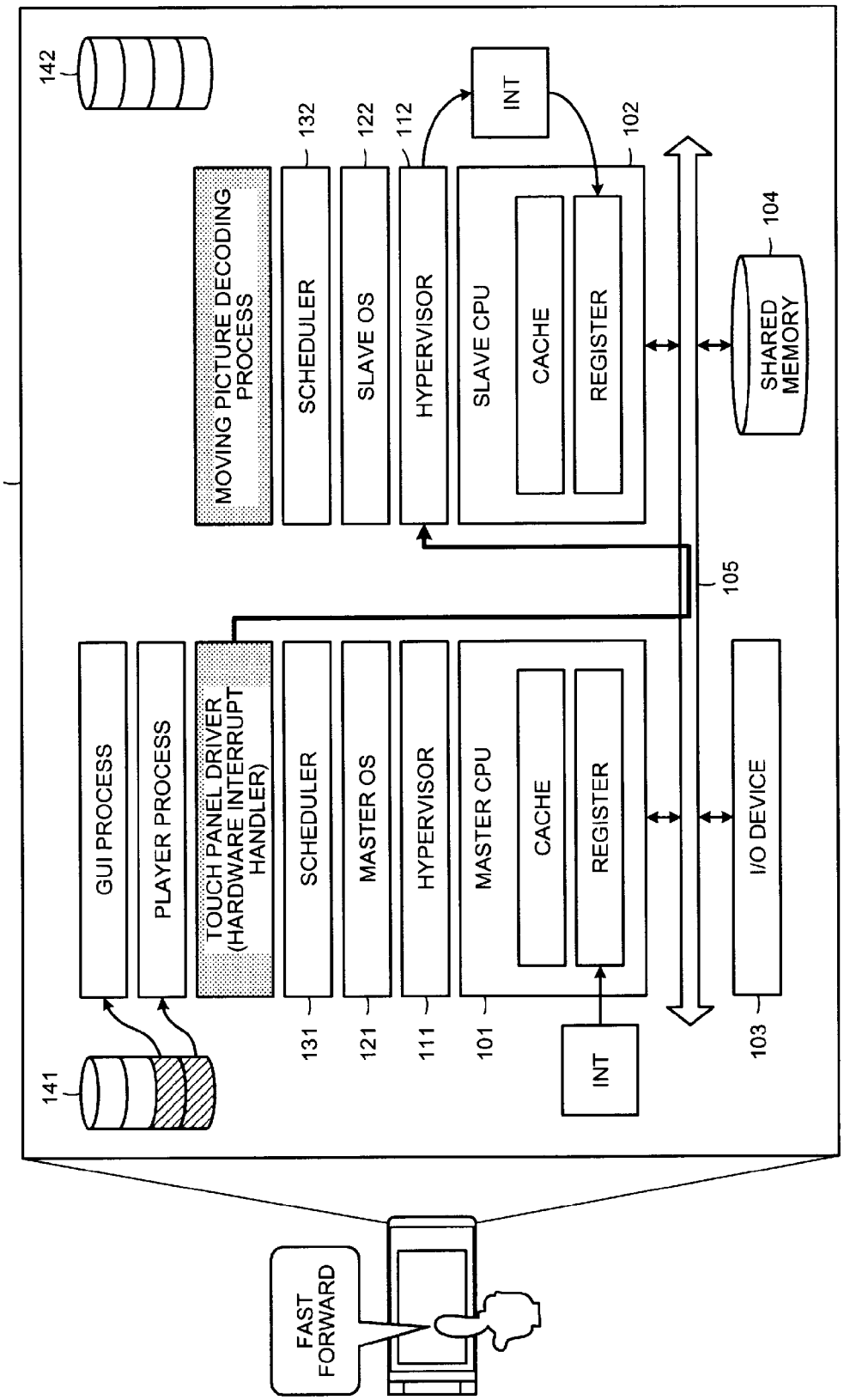
FIG. 2 is an explanatory diagram of an example in which a hardware interrupt request occurs.

FIG. 2 is an explanatory diagram of an example in which a hardware interrupt request occurs. In FIG. 2, fast forwarding of a moving picture by a user causes an input/output (I/O) device 103 (liquid crystal panel) to issue a hardware interrupt request. When the master CPU 101 detects the hardware interrupt request, a master OS 121 saves the player process to the ready-queue 142, and executes a touch screen driver, which is a hardware interrupt handler.

Subsequently, when the master OS 121 attempts to cause the touch screen driver to execute a seek process through a software interrupt request, the master OS 121 determines the CPU to which a moving picture decoding process that to be interrupted, is assigned.

In this example, the master OS 121 determines that the moving picture decoding process is assigned to the slave CPU 102. Because the moving picture decoding process is assigned to the slave CPU 102, the master OS 121 causes the master CPU 101 to send through inter-processor interrupt communication to the slave CPU 102, a software interrupt request calling the seek process.

A hypervisor 112 monitors communication between processors and detects the software interrupt request. When detecting the software interrupt request, the hypervisor 112 determines whether the seek process, which is a software interrupt handler of the software interrupt request, is a process having a high priority level. The hypervisor 112 determines whether the software interrupt request is a specific software interrupt request, based on the priority level of the seek process. In this example, the hypervisor 112 determines that the seek process is a process having a high priority level. The hypervisor 112 then generates a false hardware interrupt request to the slave CPU 102. For example, a predetermined register value corresponding to the seek process is set in a register related to hardware interrupt in the slave CPU 102.

Figure 3:
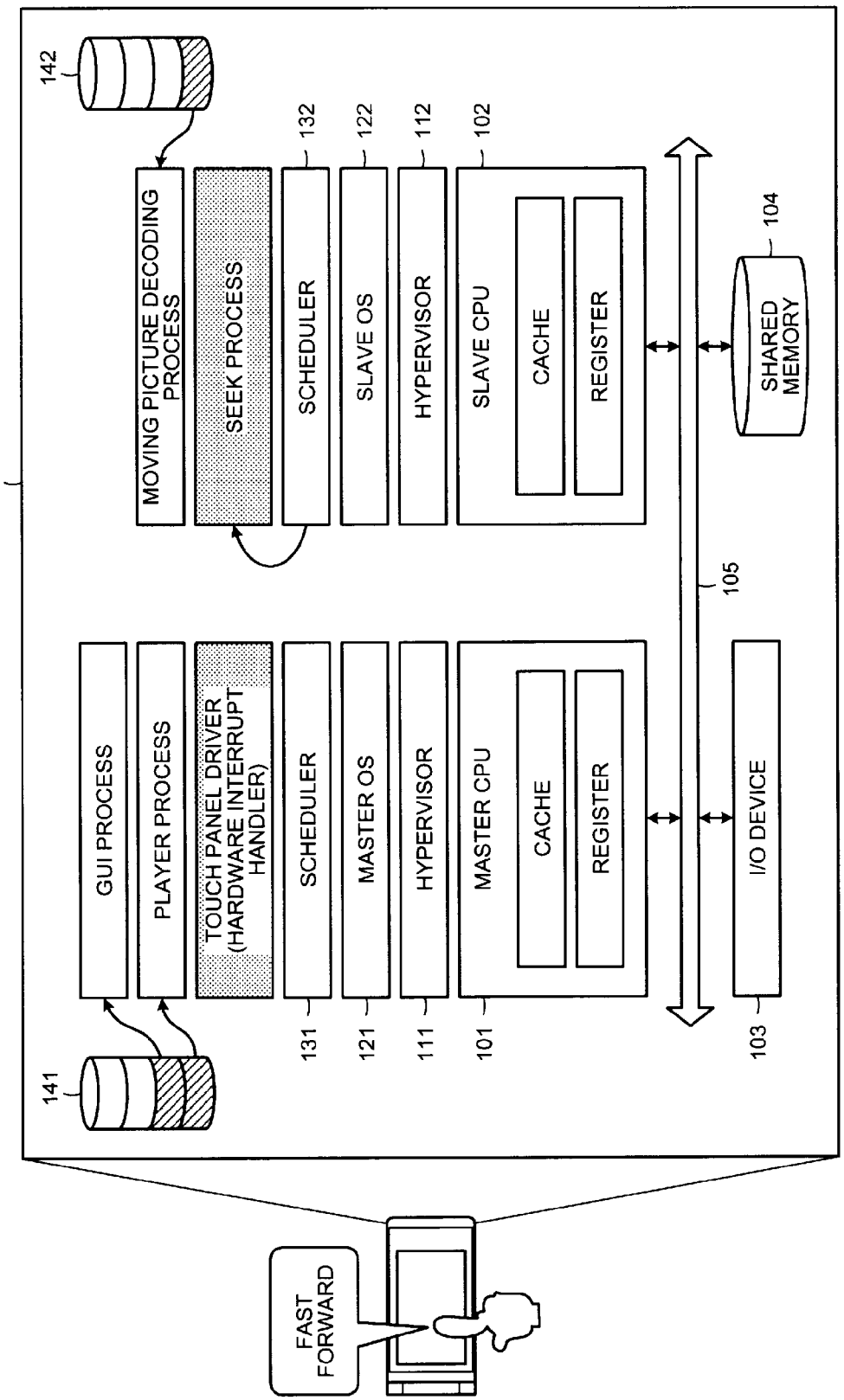
FIG. 3 is an explanatory diagram of an example in which a seek process is executed immediately.

FIG. 3 is an explanatory diagram of an example in which the seek process is executed immediately. When a value is set in the register related to hardware interrupt in the slave CPU 102, the slave CPU 102 identifies the address corresponding to the set value. A slave OS 122 running on the slave CPU 102 saves the moving picture decoding process under execution to the head of the ready-queue 142, and jumps to the identified address to execute the seek process.

In this manner, the seek process is executed immediately, so that the response of a process having a high priority level is improved. If the seek process is a process having a low priority level, the slave OS 122 queues the seek process in the ready-queue 142 and as in a conventional case, the seek process awaits execution.

Figure 4:
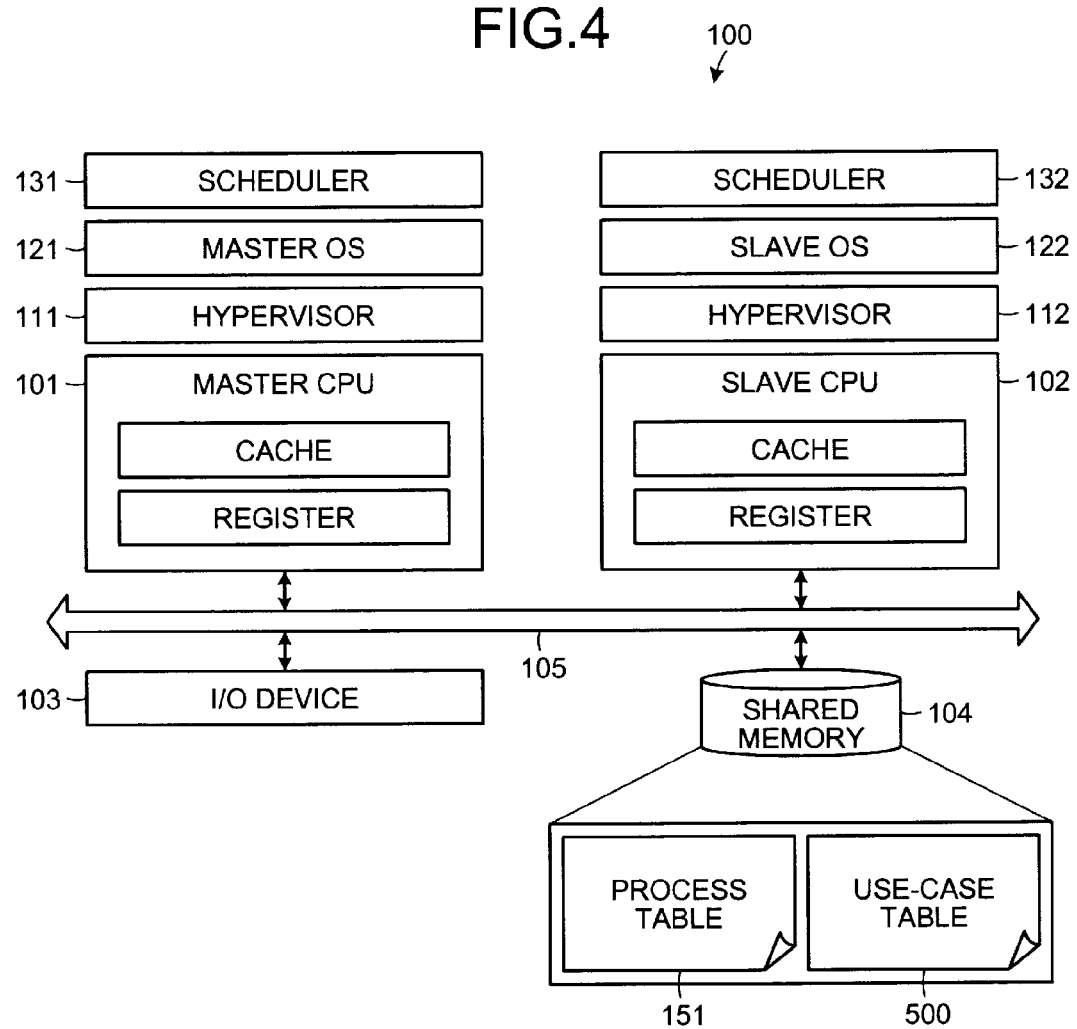
FIG. 4 is a block diagram of a hardware configuration of a multi-core processor system.

FIG. 4 is a block diagram of a hardware configuration of the multi-core processor system 100. In FIG. 4, the multi-core processor system 100 includes the master CPU 101, the slave CPU 102, a shared memory 104, and an I/O device 103. These units are interconnected via a bus 105. FIG. 1 depicts an example where the multi-core processor system 100 is implemented as a cellular phone. However, implementation of the multi-core processor system 100 is not limited to a cellular phone and may be a portable information terminal, such as a cellular phone and a electronic book reader device, and a personal computer.

The master CPU 101 and the slave CPU 102 respectively have a core, a register, and cache. The register of each CPU has a register related to hardware interrupt (hereinafter "hardware interrupts register"). When a value is set in the hardware interrupt register, the address of an interrupt process is identified based on the set value, and the CPU jumps to the address to immediately execute the interrupt process.

Each CPU has an interrupt vector table, in which the corresponding relation between values in the register and addresses of the interrupt processes are described. In a hardware interrupt request, a value corresponding to the hardware interrupt request is set in the hardware interrupt register. When a value is set in the hardware interrupt register of a CPU, the CPU searches the interrupt vector table for the set value and identifies the address corresponding to the set value. The CPU then jumps to the identified address.

In the examples, the interrupt vector table includes not only addresses of the hardware interrupt process but also addresses of the software interrupt process. In the interrupt vector table, a value that can be set in the hardware interrupt register is determined in advance for each hardware interrupt request and software interrupt process.

The master CPU 101 executes the hypervisor 111 and the master OS 121, and carries out overall control over of the multi-core processor system 100. The master OS 121 has a scheduler 131 that determines to which CPU a task is to be assigned and controls task switching at the master CPU 101. The slave CPU 102 executes the hypervisor 112 and slave OS 122. The slave OS 122 has a scheduler 132 that controls task switching at the slave CPU 102.

The hypervisor 111 and the hypervisor 112 are programs that operate directly on hardware, i.e., the master CPU 101 and the slave CPU 102, and that are stored in registers in the hardware. The hypervisor 111 is able to execute a privileged command to directly refer to the master CPU 101, to read information out of the register in the master CPU 101, or to rewrite information in the register in the master CPU 101. The hypervisor 112 is able to execute a privileged command to directly refer to the slave CPU 102, to read information out of the register in the slave CPU 102, or to rewrite information in the register in the slave CPU 102.

The I/O device 103 is a device that the user is able to operate directly or to operate via a network. For example, the I/O device 103 is provided as a keyboard, a liquid crystal touch panel, a mouse, etc. For example, the I/O device 103 in the form of a keyboard has keys for entering characters, figures, and various instructions, and is used to input data. The I/O device 103 in the form of a liquid crystal touch screen is used to input data and output characters, figures, images, etc.

The shared memory 104 is memory shared by the multi-core processor, and stores a process table 151 and a use-case table 500. For example, the shared memory 104 includes read-only memory (ROM), random access memory (RAM), and flash ROM.

For example, the flash ROM stores programs of each OS; the ROM stores application programs, and the RAM is used as a work area for the master CPU 101 and the slave CPU 102. A program stored in the shared memory 104 is loaded onto each CPU to cause the CPU to execute a coded process.

The process table 151 is information indicating to which CPU a task is assigned and which task a CPU is executing. After startup, each OS reads out the contents of the process table 151 and stores the read contents to the cache of the respective CPU. Having assigned a task, the scheduler 131 enters the assigned task into the process table 151. When task switching occurs, each scheduler enters into the process table 151, information indicating which task has entered a state of execution. Having rewritten contents of the process table 151, each scheduler executes a snoop process to update each process table 151 stored in the cache of each CPU. The use-case table 500 will be described with reference to FIG. 5.

Figure 5:
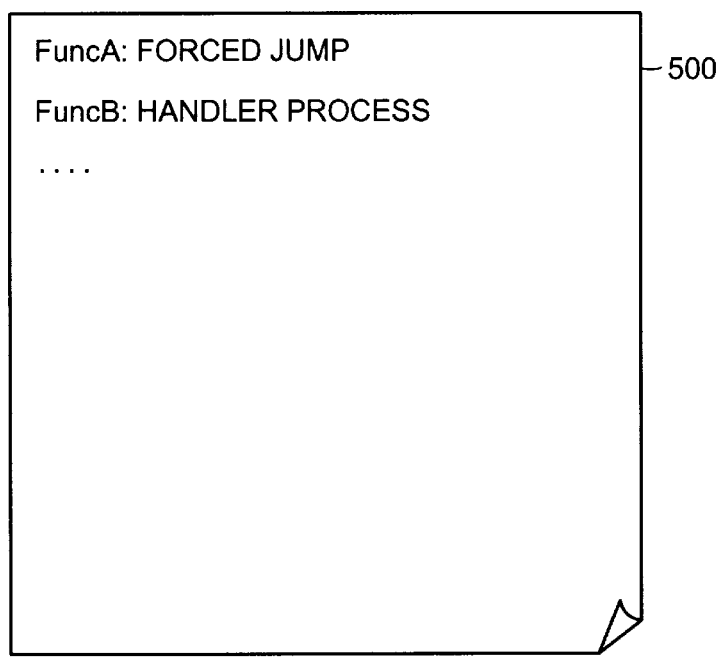
FIG. 5 is an explanatory diagram of one example of a use-case table according to a first example.

FIG. 5 is an explanatory diagram of one example of the use-case table 500 according to a first example. The use-case table 500 includes information indicating for each function, whether the function is forcibly executed during an interrupt and that whether an interrupt is allowed during execution of the function. For example, FuncA is described as "forced jump" and FuncB is described as "handler process". When the FuncA is called as a software interrupt, the multi-core processor system 100 executes the FuncA immediately. When the FuncB is called as a software interrupt, the multi-core processor system 100 registers the FuncB with the ready-queue 142.

In the embodiments, a function described as "forced jump" represents a process of which the priority level is high, and a function described as "handler process" represents a process of which the priority level is not high (is low).

One example of an interrupt process having a high priority level is an interrupt process associated with a specific hardware interrupt request. For example, the seek process depicted in FIG. 3 is an interrupt process associated with the touch screen driver. A specific hardware interrupt request is, for example, a hardware interrupt request generated by a user operation. User operations include, for example, an operation on the touch screen, on the keyboard, of the mouse, etc.

The use-case table 500 is made in advance by a designer when the designer designs application software. A process to which the designer wants to give high priority, therefore, may be entered in the use-case table 500, as a process having a high priority level.

The address of a function described as "forced jump", which is information indicating whether the function is forcibly executed during an interrupt, in the use-case table 500 is entered into the interrupt vector table. The use-case table 500 is stored to the cache of each CPU as soon as the multi-core processor system 100 is started.

Figure 6:
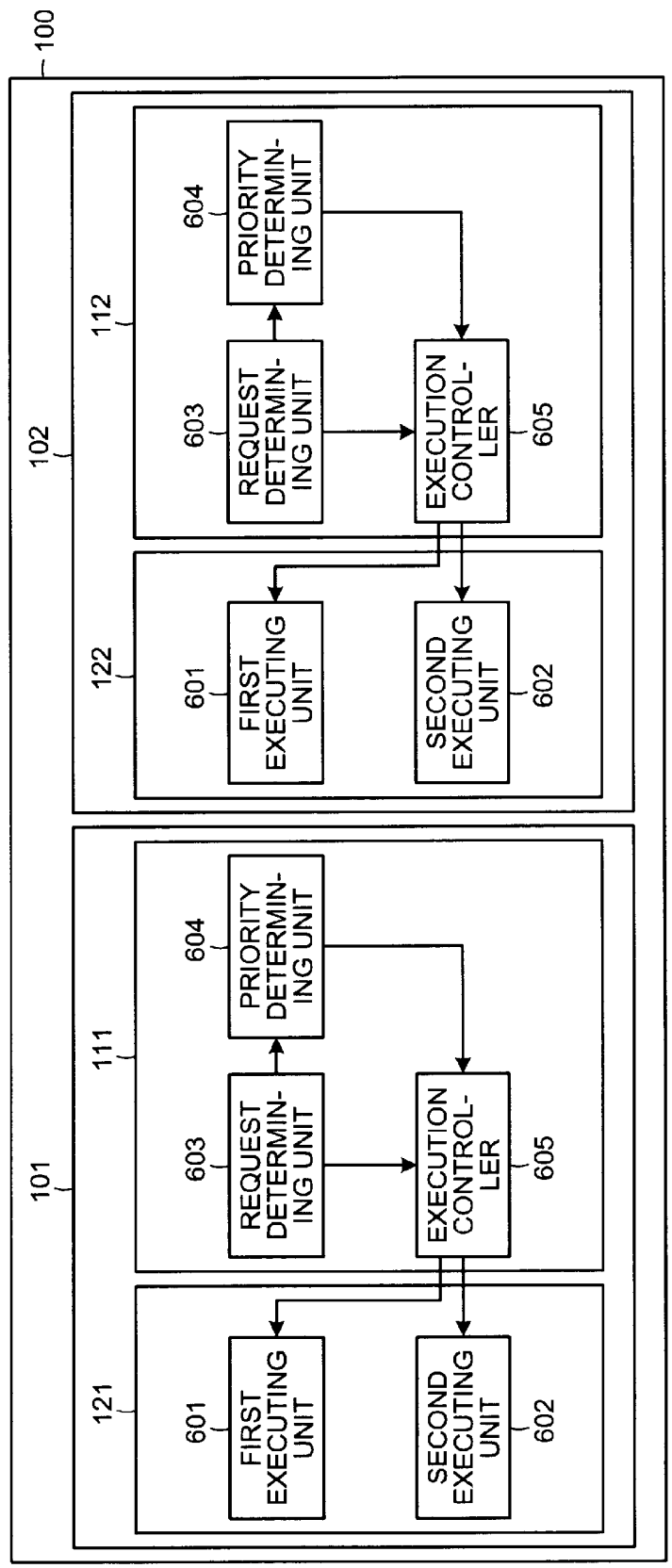
FIG. 6 is a block diagram of the multi-core processor system.

FIG. 6 is a block diagram of the multi-core processor system 100. Each CPU of the multi-core processor system 100 includes a first executing unit 601, a second executing unit 602, a request determining unit 603, a priority determining unit 604, and an execution controller 605. Each of these units (first executing unit 601 to execution controller 605) is capable of, for example, causing each CPU to execute a program stored in the shared memory 104. The first and second executing units 601 and 602 are programs installed in OS running on each CPU (master OS 121 and slave OS 122 in the examples). The request determining unit 603, the priority determining unit 604, and the execution controller 605 are programs installed in the hypervisor running on each CPU (hypervisor 111 and hypervisor 112 in the embodiments).

The first executing unit 601 causes a software interrupt handler of a software interrupt request to be queued, and executes queued processes in the order of queuing.

The second executing unit 602 preferentially executes a software interrupt handler of a hardware interrupt request over a process under execution.

The request determining unit 603 determines whether a software interrupt request is a specific software interrupt request. In the embodiments, whether a software interrupt request is a specific software interrupt request is determined based on a determination on whether a software interrupt handler of the software interrupt request is a process having a high priority level.

When the request determining unit 603 determines that a software interrupt request is a specific software interrupt request, the execution controller 605 does not cause the first executing unit 601 to put a software interrupt handler of the software interrupt request in a stand-by state but causes the second executing unit 602 to execute the software interrupt handler preferentially.

When the request determining unit 603 determines that a software interrupt request is a specific software interrupt request, the priority determining unit 604 determines whether a process under execution permits preferential execution of a software interrupt handler of the software interrupt request over the process under execution, based on a given criterion.

When the priority determining unit 604 determines that a process under execution does not permit preferential execution of a software interrupt handler for a software interrupt request over the process under execution, the execution controller 605 causes the second executing unit 602 to preferentially execute the software interrupt handler of the software interrupt request after the process under execution is ended or when task switching occurs.

In addition to the above description, first and second examples will be described in detail with reference to the drawings. The first example relates to an example in which based on whether a software interrupt handler called through inter-processor interrupt communication is a function having a high priority level, whether the software interrupt handler is executed immediately or caused to stand by, is determined. The second example relates to an example in which based on whether a task under execution permits an interrupt, whether a software interrupt handler is executed immediately or is executed after the task under execution is ended or when task switching occurs, is determined.

Figure 7:
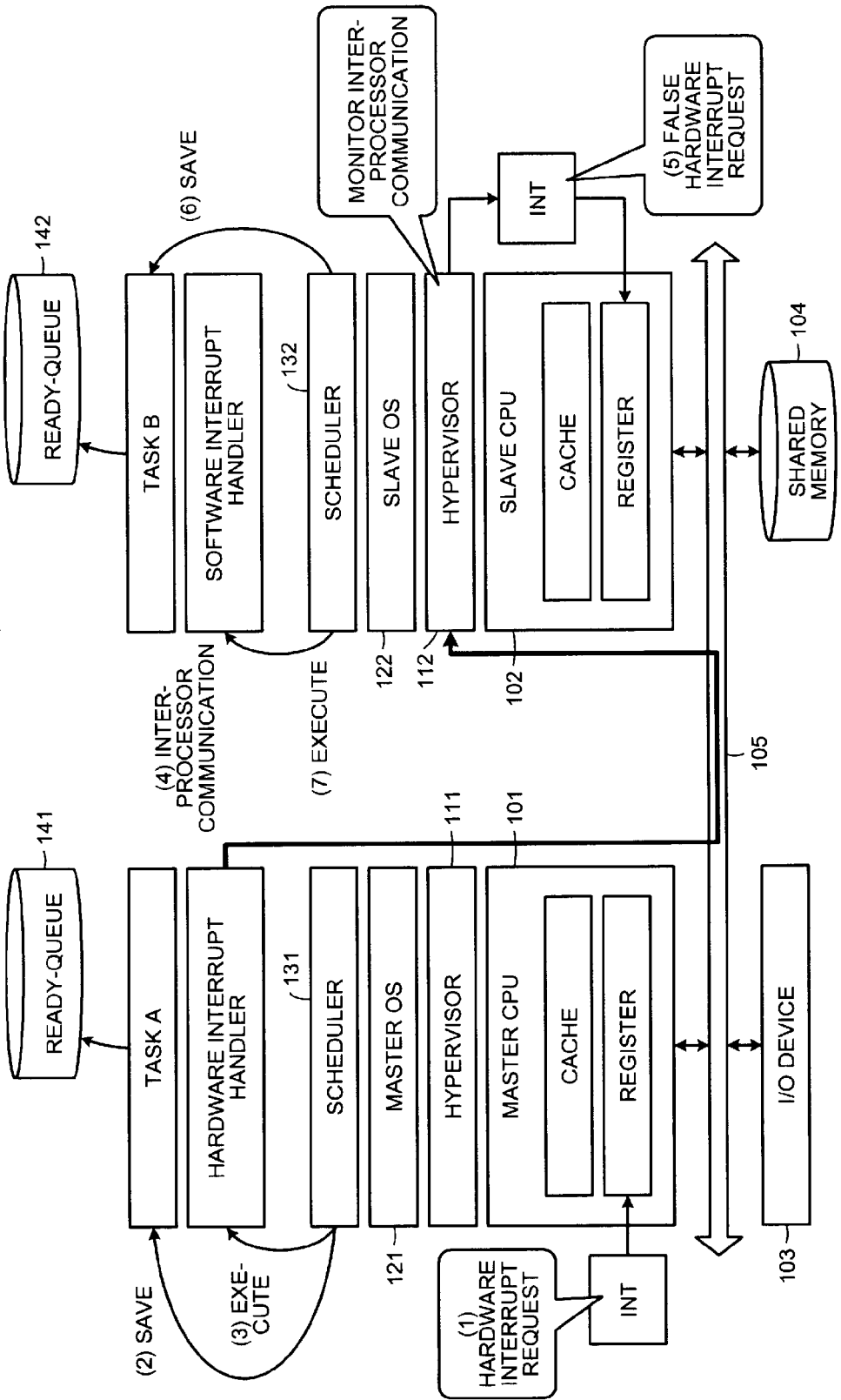
FIG. 7 is an explanatory diagram of the first example.

FIG. 7 is an explanatory diagram of the first example. (1) When a hardware interrupt request is made to the master CPU 101 via the I/O device 103, the master OS 121 (2) immediately saves a task A being executed on the master CPU 101.

The master OS 121 then (3) executes a hardware interrupt handler of the hardware interrupt request. The master OS 121 uses the process table 151 and identifies the CPU to which the task interrupted by a software interrupt handler called by the hardware interrupt handler is assigned. In this example, the interrupted task is a task B, and the slave CPU 102 is identified as the CPU to which the task B is assigned. The master OS 121 (4) then sends a software interrupt request to the slave CPU 102 through inter-processor interrupt communication.

The hypervisor 112 monitors communication between processors, and detects the software interrupt request. Upon detecting the software interrupt request, the hypervisor 112 searches the use-case table 500 to locate a software interrupt handler of the detected software interrupt request, and determines whether the software interrupt handler is a process having a high priority level. In this example, the software interrupt handler is a process having a high priority level.

Upon determining that the software interrupt handler is a process having a high priority level, the hypervisor 112 (5) generates a false hardware interrupt request to the slave CPU 102. Generation of a false hardware interrupt request by the hypervisor 112 means, for example, that the hypervisor 112 sets a value corresponding to the software interrupt handler in the hardware interrupt register in the register of the slave CPU 102. The slave CPU 102 identifies the address corresponding to the set value, using the interrupt vector table. The slave OS 122 then (6) saves the task B, which is under execution, to the head of the ready-queue 142, and (7) jumps to the identified address to execute the software interrupt handler.

Figure 8:
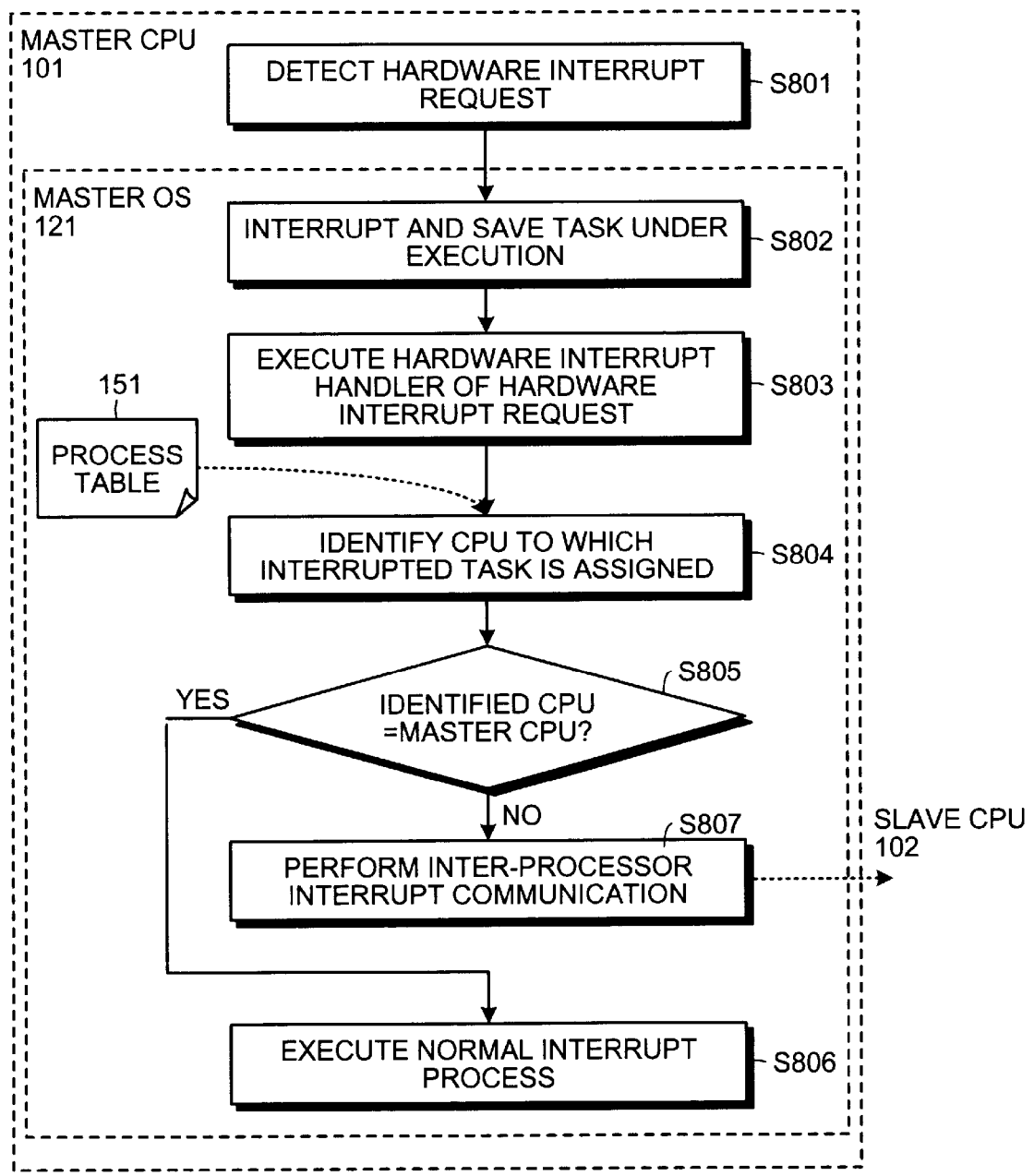
FIG. 8 is a first flowchart of a control procedure by the multi-core processor system of the first example.
Figure 9:
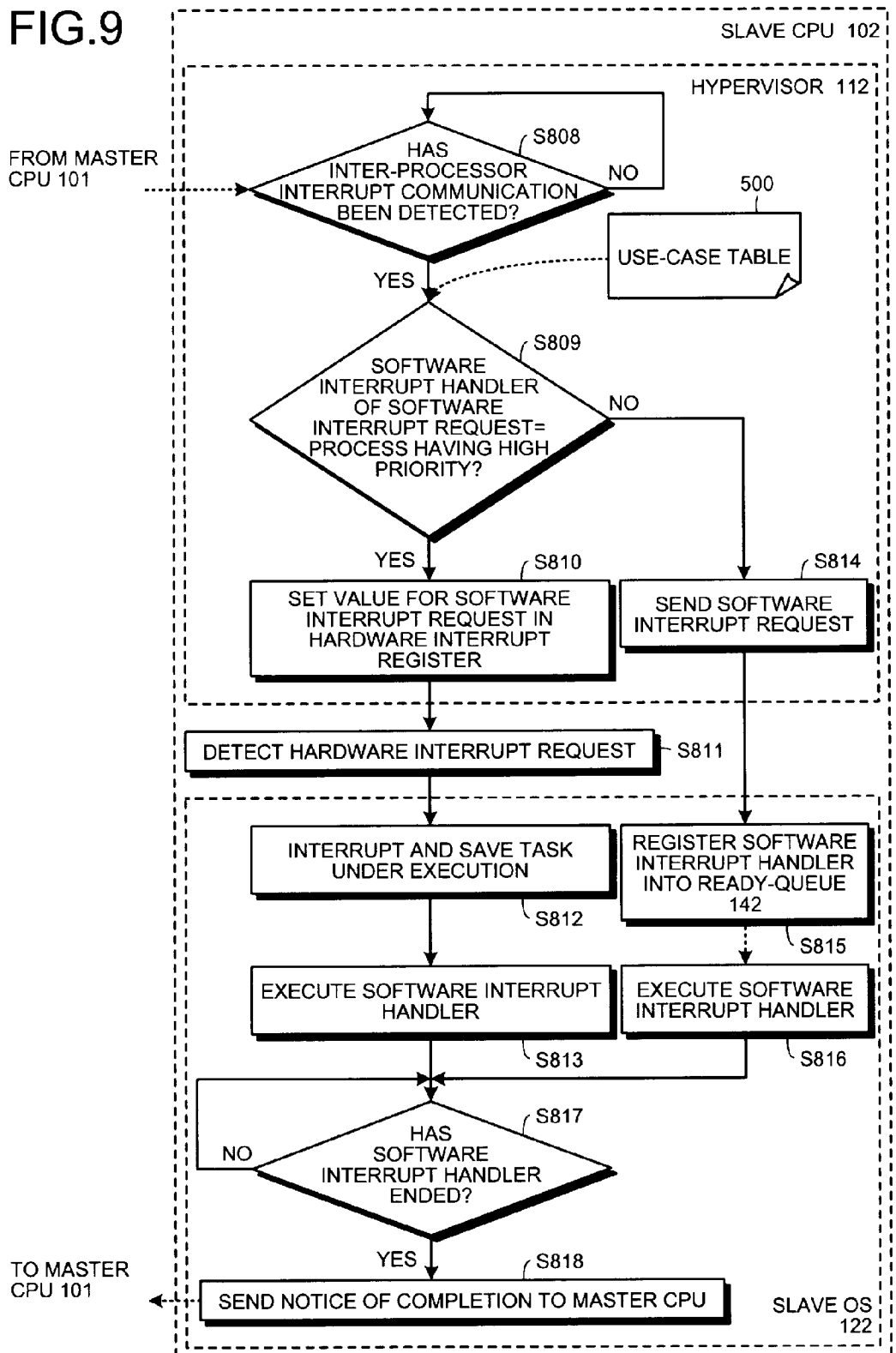
FIG. 9 is a second flowchart of the control procedure by the multi-core processor system of the first example.

FIGS. 8 and 9 are flowcharts of a control procedure by the multi-core processor system 100 of the first example. These flowcharts describe a case where a hardware interrupt request is generated at the master CPU 101. The master CPU 101 detects a hardware interrupt request (step S801), and the master OS 121 running on the master CPU 101 interrupts a task under execution and saves the task to the ready-queue 141 (step S802). The master OS 121 then executes a hardware interrupt handler of the hardware interrupt request (step S803), and using the process table 151, identifies a CPU to which the interrupted task is assigned (step S804).

The master OS 121 then determines whether the identified CPU is the master CPU 101 (step S805). If the identified CPU is the master CPU 101 (step S805: YES), the master OS 121 executes a normal interrupt process (step S806). If the identified CPU is not the master CPU 101 (step S805: NO), the master OS 121 carries out inter-processor interrupt communication with the identified CPU (step S807). In this inter-processor interrupt communication, a software interrupt request including added information concerning a function be called is sent to the identified CPU.

Meanwhile, the hypervisor 112 running on the slave CPU 102 monitors communication between processors, and determines whether inter-processor interrupt communication has been detected (step S808). The hypervisor 112 detects only the inter-processor interrupt communication with the slave CPU 102. If the hypervisor 112 determines that inter-processor interrupt communication has not been detected (step S808: NO), the procedure returns to step S808. In this manner, the hypervisor 112 constantly monitors communication between processors to detect inter-processor interrupt communication.

If the hypervisor 112 determines that inter-processor interrupt communication has been detected (step S808: YES), the hypervisor 112 uses the use-case table 500 and determines whether a software interrupt handler of the software interrupt request is a process having a high priority (step S809). Upon determining that the software interrupt handler of the software interrupt request is a process having a high priority (step S809: YES), the hypervisor 112 sets a value for the software interrupt request in the hardware interrupt register of the slave CPU 102 (step S810).

As a result of setting the value in the hardware interrupt register, the slave CPU 102 detects a hardware interrupt request (step S811). Although the detected hardware interrupt request is actually the software interrupt request, the slave CPU 102 merely detects the value set in the hardware interrupt register and makes no determination on whether the value represents the hardware interrupt request. The slave OS 122 running on the slave CPU 102 interrupts the task under execution and saves the task to the ready-queue 142 (step S812). The slave OS 122 then executes the software interrupt handler of the software interrupt request (step S813), and the procedure proceeds to step S817.

When the hypervisor 112 determines that the software interrupt handler of the software interrupt request is not a process having a high priority (step S809: NO), the hypervisor 112 sends the software interrupt request to the slave OS 122 (step S814). The hypervisor 112 sending the software interrupt request means that the hypervisor 112 sends an instruction to place the software interrupt request in the ready-queue 142 to cause the software interrupt request to be queued. Receiving the notice, the slave OS 122 registers the software interrupt handler into the ready-queue 142 (step S815), and executes processes in the ready-queue 142 in the order of registration to execute the software interrupt handler (step S816).

Following step S813 or S816, the slave OS 122 determines whether the software interrupt handler has ended (step S817). If the slave OS 122 determines that the software interrupt handler is not ended (step S817: NO), the procedure returns to step S817. If the slave OS 122 determines that the software interrupt handler is ended (step S817: YES), the slave OS 122 sends a notice of completion of the software interrupt handler to the master CPU 101 (step S818).

In the examples, the hypervisor 112 running on the slave CPU 102 constantly monitors communication between processors to detect inter-processor interrupt communication. However, for example, the hypervisor 111 running on the master CPU 101 may send a notice of execution of inter-processor interrupt communication to the hypervisor 112 running on the CPU 102 right before execution of the inter-processor interrupt communication and then execute the inter-processor interrupt communication. This allows the hypervisor 112 running on the CPU 102 to detect inter-processor interrupt communication without constantly monitoring communication between processors.

The second example relates to a case where whether a software interrupt handler with a high priority level is executed immediately or executed after a task under execution is ended or when task switching occurs is determined, based on whether the task under execution permits an interrupt.

In the second example, if a task under execution does not permit an interrupt, a flag indicating whether the task under execution is ended or task switching occurs is set as Process ID. Process ID=0 indicates a task is under execution, and Process ID=1 indicates that a task under execution has ended or that task switching occurs.

FIG. 10 is an explanatory diagram of one example of the use-case table of the second example. A use-case table 1000 has information indicating for each function, whether the function is forcibly executed during an interrupt and whether an interrupt is allowed during execution of the function, and information indicating for each task, whether an interrupt is allowed during execution of the task. For example, the FuncA is described as "forced jump" and "interrupt not allowed", and the FuncB is described as "handler process" and "interrupt allowed".

For example, the task A is described as "-" and "interrupt allowed", the task B is described as "-" and "interrupt allowed", and the task C is described as "-" and "interrupt not allowed". In the examples, only the function is called as the interrupt handler. For this reason, information concerning whether the task is forcibly executed during an interrupt is not described for the task A and the task B.

For example, when a software interrupt occurs during execution of the task A, the task A is saved and a software interrupt handler is called to be executed because the information concerning the task A indicating whether an interrupt is allowed during execution of the task A is "interrupt is allowed". In contrast, the information concerning the task C indicating whether an interrupt is allowed during execution of the task C is "interrupt is not allowed". When a software interrupt occurs during execution of the task C, therefore, a software interrupt handler is called and executed after execution of the task C has ended or when task switching occurs. In the second example, the use-case table 1000 is stored in the shared memory 104. The use-case table 1000 may be stored to the cache of each CPU as soon as the multi-core processor system 100 is started.

Figure 11:
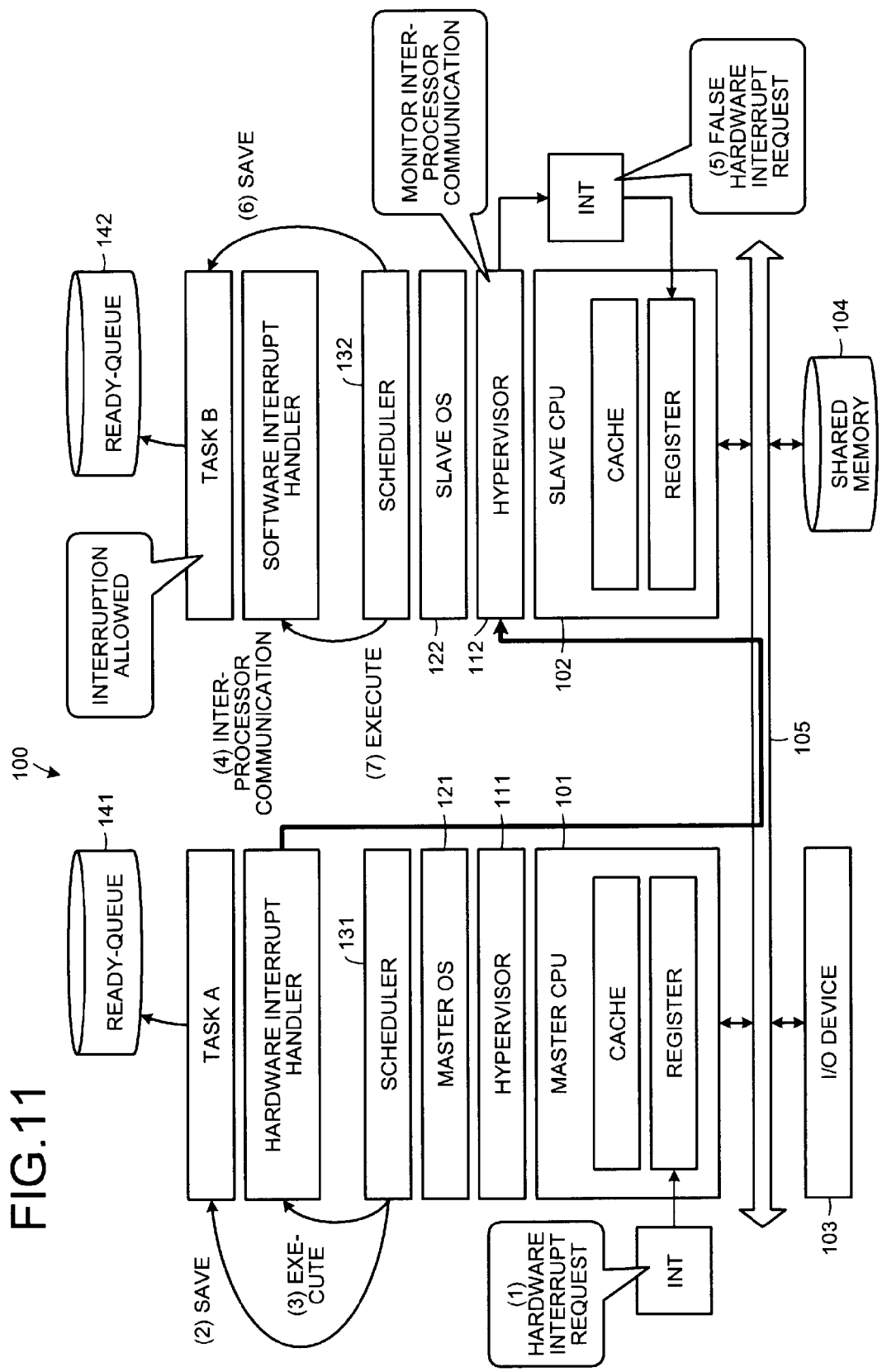
FIG. 11 is an explanatory diagram of a state of execution of a task allowing an interrupt according to the second example.

FIG. 11 is an explanatory diagram of a state of execution of a task allowing an interrupt according to the second example. In FIG. 11, a task subject to a software interrupt called by a hardware interrupt handler is the task B. (1) When a hardware interrupt request is generated at the master CPU 101, the master OS 121 (2) interrupts and saves the task A to the ready-queue 141, and (3) executes a hardware interrupt handler of the hardware interrupt request. The master OS 121 identifies the CPU to which the task B that was interrupted by a software interrupt handler called by the hardware interrupt handler is assigned. In this example, since the task B is being executed at the slave CPU 102, the slave CPU 102 is identified.

The master OS 121 sends a software interrupt request to the slave CPU 102 through inter-processor interrupt communication. The hypervisor 112 monitors communication between processors and detects the inter-processor interrupt communication made by the slave CPU 102. The hypervisor 112 then uses the use-case table 1000 and determines whether the software interrupt handler of the software interrupt request is a process having a high priority level. In this example, the software interrupt handler of the software interrupt request is a process having a high priority level.

Subsequently, the hypervisor 112 identifies a task under execution, uses the use-case table 1000 and determines whether the task under execution allows preferential execution of an interrupt process over the task under execution. In this example, the task B is determined to be a task allowing an interrupt.

If the task B is determined to be a task allowing an interrupt, the hypervisor 112 (5) generates a false hardware interrupt request at the slave CPU 102, i.e., sets a value corresponding to the software interrupt request in the hardware interrupt register. The slave CPU 102 then detects the value set in the hardware interrupt register and thereby, detects the hardware interrupt request. The slave OS 122, thus, (6) saves the task B under execution to the ready-queue 142, and (7) executes the software interrupt handler of the software interrupt request.

Figure 12:
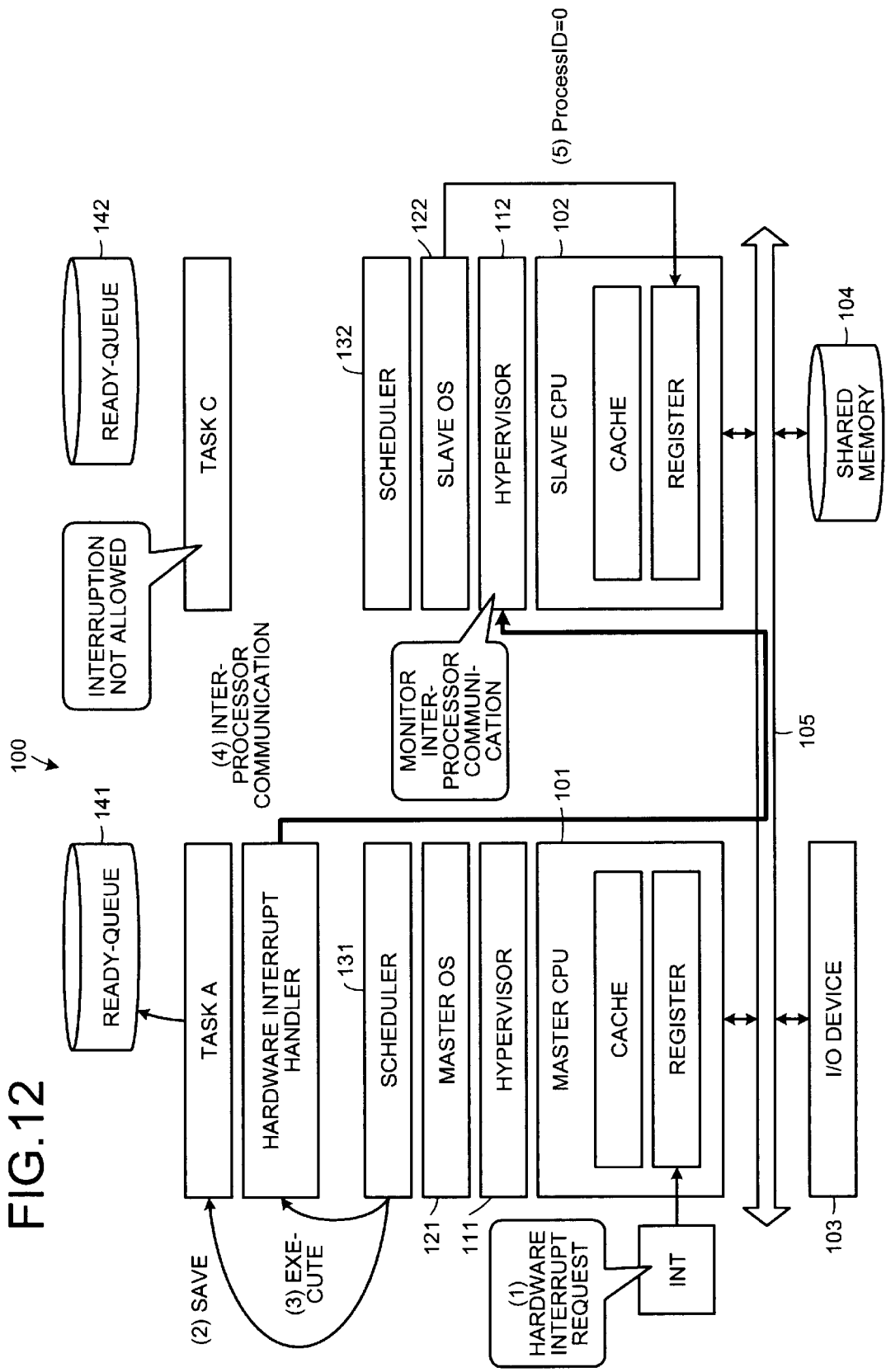
FIG. 12 is a first explanatory diagram of a state of execution of a task not allowing an interrupt according to the second example.

FIG. 12 is a first explanatory diagram of a state of execution of a task not allowing an interrupt according to the second example. In FIG. 12, a task subject to a software interrupt called by a hardware interrupt handler is the task C. Processes indicated by (1) to (4) in FIG. 12 are the same as those indicated by (1) to (4) in FIG. 11, and are therefore omitted in further description.

The hypervisor 112 monitors communication between processors and detects inter-processor interrupt communication to the slave CPU 102. The hypervisor 112 then identifies a task under execution, and determines whether the task C, which is under execution, is a task allowing an interrupt. The task C is determined to be a task that does not allow an interrupt. The hypervisor 112 then (5) sets the Process ID to 0. The slave OS 122 uses the process table 151 and determines whether the task C has ended or task switching occurs.

Figure 13:
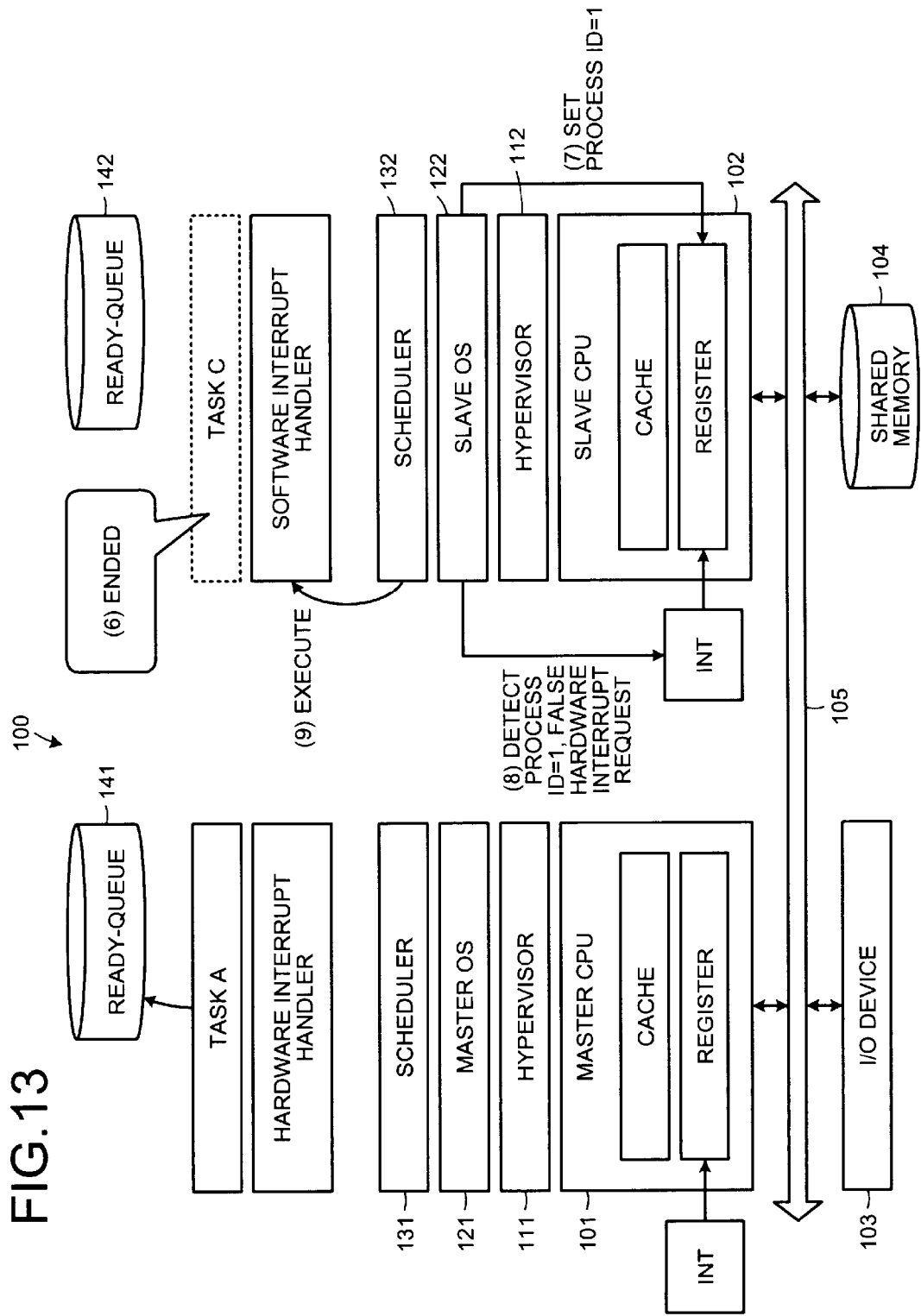
FIG. 13 is a second explanatory diagram of a state of execution of a task not allowing an interrupt according to the second example.

FIG. 13 is a second explanatory diagram of a state of execution of a task not allowing an interrupt according to the second example. (6) If the task C has ended or task switching occurs, the slave OS 122 detects the end of the task C, and (7) sets the Process ID to 1. The hypervisor 112 (8) detects the change in the value of the Process ID from 0 to 1, and generates a false hardware interrupt request to the slave CPU 102. When the false hardware interrupt request is generated, the slave OS 122 (9) executes a software interrupt handler.

Figure 14:
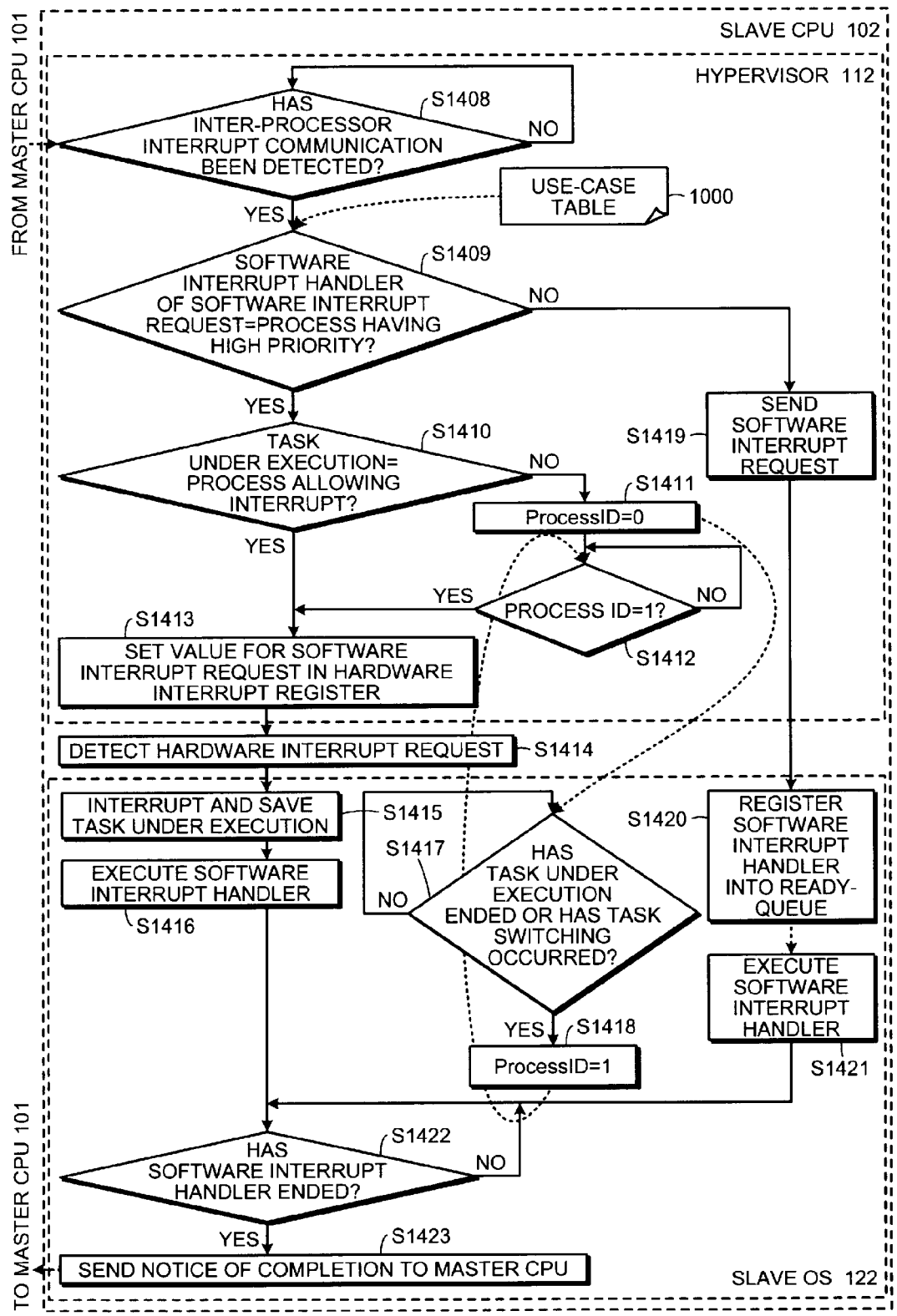
FIG. 14 is a flowchart of a control procedure by the multi-core processor system of the second example.

FIG. 14 is a flowchart of a control procedure by the multi-core processor system 100 of the second example. The process carried out by the master CPU 101 is the same as the control procedure by the multi-core processor system 100 of the first example depicted in FIG. 8, and is therefore omitted in further description. In this flowchart, the procedure is described for a case where the master CPU 101 makes inter-processor interrupt communication with the slave CPU 102. The process carried out by the master CPU 101 is represented as steps S1401 to S1407 (identical to steps S801 to 807 of FIG. 8).

The hypervisor 112 running on the slave CPU 102 monitors communication between processors, and determines whether inter-processor interrupt communication has been detected (step S1408). If the hypervisor 112 determines that inter-processor interrupt communication has not been detected (step S1408: NO), the procedure returns to step S1408. In this manner, the hypervisor 112 constantly monitors communication between processors to detect inter-processor interrupt communication.

If the hypervisor 112 determines that inter-processor interrupt communication has been detected (step S1408: YES), the hypervisor 112 uses the use-case table 1000 and determines whether a software interrupt handler for a software interrupt request is a process having a high priority level (step S1409). Upon determining that the software interrupt handler is a process having a high priority level (step S1409: YES), the hypervisor 112 determines whether the task under execution is a process allowing an interrupt (step S1410).

If the hypervisor 112 determines that the task under execution is not a process allowing an interrupt (step S1410: NO), the Process ID is set to 0 (step S1411). The slave OS 122 then determines whether the task under execution has ended or task switching has occurred (step S1417). If the slave OS 122 determines that the task is still under execution (step 1417: NO), the procedure returns to step S1413. If the slave OS 122 determines that the task under execution has ended or task switching has occurred (step S1417: YES), the Process ID is set to 1 (step S1418).

Following step S1411, the hypervisor 112 determines whether the Process ID is 1 (step S1412). If the hypervisor 112 determines that the Process ID is not 1 (step S1412: NO), the step S1412 is carried out again. If the hypervisor 112 determines that the Process ID is 1 (step S1412: YES), hypervisor 112 sets a value for the software interrupt request in the hardware interrupt register (step S1413).

Subsequently, the slave CPU 102 detects a hardware interrupt request (step S1414), and the slave OS 122 interrupts and saves the task under execution to the ready-queue 142 (step S1415). The slave OS 122 then executes the software interrupt handler (step S1416), after which the procedure proceeds to step S1420.

Upon determining that the software interrupt handler is not a process having a high priority level at step S1409 (step S1409: NO), the hypervisor 112 sends a software interrupt request to the slave OS 122 (step S1419). The slave OS 122 places the software interrupt handler in the ready-queue 142 to queue the software interrupt handler (step S1420), and executes queued processes in the order of queuing to execute the software interrupt handler (step S1421).

Following step S1416 or S1421, the slave OS 122 determines whether the software interrupt handler has ended (step S1422). If the slave OS 122 determines that the software interrupt handler has not ended (step S1422: NO), the procedure returns to step S1420. If determining that the software interrupt handler has ended (step S1422: YES), the slave OS 122 sends a notice of completion of the software interrupt handler to the master CPU 101 (step S1423).

As described above, according to the multi-core processor system, the control program, and the control method, an interrupt process of a specific software interrupt request is not caused to queue but is executed preferentially over a process under execution. As a result, the response of an interrupt is speeded up.

When a specific software interrupt request is a software interrupt request related to a specific hardware interrupt request, the response of an interrupt from an external device is speeded up.

When a specific hardware interrupt request is a hardware interrupt request generated by a user operation, the response of an interrupt by a user operation is speeded up, thereby allowing the user to operate the system without to the frustration of a slow response.

When a process under execution does not allow preferential execution of an interrupt process of a software interrupt request over the process under execution, the interrupt process is executed after the process under execution has ended or when task switching occurs. As a result, the response of an interrupt is speeded up without interrupting the process under execution and having a high priority level.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A multi-core processor system comprising a given core configured to:
   queue an interrupt process of a software interrupt request to the given core, and execute queued processes in an order of queuing at the given core;
   execute preferentially an interrupt process of a hardware interrupt request to the given core over a process under execution at the given core;
   determine whether the software interrupt request is a specific software interrupt request; and
   perform control to preferentially execute the interrupt process without queuing, upon determining that the software interrupt request is the specific software interrupt request.

2. The multi-core processor system according to claim 1, wherein
   the specific software interrupt request is a software interrupt request related to a specific hardware interrupt request.

3. The multi-core processor system according to claim 2, wherein
   the specific hardware interrupt request is a hardware interrupt request generated by a user operation.

4. The multi-core processor system according to claim 1, the given core configured to determine based on a given criterion, whether the process under execution allows preferential execution of the interrupt process of the software interrupt request over the process under execution, upon determining the software interrupt request to be the specific software interrupt request, wherein
   the given core, upon determining that the process under execution does not allow preferential execution of the interrupt process of the software interrupt request over the process under execution, causes the interrupt process of the software interrupt request to be executed preferentially after the process under execution at the given core has ended or when process switching is carried out.

5. A non-transitory computer-readable recording medium storing a program for a multi-core processor system that includes a given core comprising:
   a first executor configured to queue an interrupt process of a software interrupt request to the given core, and to execute queued processes in an order of queuing at the given core; and
   a second executor configured to execute preferentially an interrupt process of a hardware interrupt request to the given core over a process under execution at the given core, wherein the program causes the given core to execute:
   determining whether the software interrupt request is a specific software interrupt request; and
   causing the second executor to preferentially execute the interrupt process without queuing, upon determining that the software interrupt request is the specific software interrupt request.

6. A control method executed by a given core in a multi-core processor system, the control method comprising:
   queuing, by a first executor, an interrupt process of a software interrupt request to the given core, and executing queued processes in an order of queuing at the given core; and
   executing, by a second executor, preferentially an interrupt process of a hardware interrupt request to the given core over a process under execution at the given core, wherein the given core executes:
   determining whether the software interrupt request is a specific software interrupt request; and
   causing the second executor to preferentially execute the interrupt process without queuing, upon determining that the software interrupt request is the specific software interrupt request.

* * * * *